(12) United States Patent
Papallo et al.

(10) Patent No.: US 7,068,483 B2
(45) Date of Patent: Jun. 27, 2006

(54) CIRCUIT BREAKER LOCKOUT

(75) Inventors: Thomas F. Papallo, Farmington, CT (US); Carmine G. Giglio, West Hartford, CT (US)

(73) Assignee: General Electric Company, Schenectady, NY (US)

( * ) Notice: Subject to any disclaimer, the term of this patent is extended or adjusted under 35 U.S.C. 154(b) by 442 days.

(21) Appl. No.: 10/373,574

(22) Filed: Feb. 25, 2003

(65) Prior Publication Data

US 2003/0231447 A1    Dec. 18, 2003

Related U.S. Application Data

(60) Provisional application No. 60/438,159, filed on Jan. 6, 2003, provisional application No. 60/359,544, filed on Feb. 25, 2002.

(51) Int. Cl.
    *H02H 3/00* (2006.01)
(52) U.S. Cl. ....................................................... 361/72
(58) Field of Classification Search ................ 361/75, 361/72
    See application file for complete search history.

(56) References Cited

U.S. PATENT DOCUMENTS

| | | | |
|---|---|---|---|
| 3,558,985 A * | 1/1971 | Krolski et al. ........... 361/61 |
| 3,772,505 A | 11/1973 | Massell | |
| 3,938,007 A | 2/1976 | Boniger et al. | |
| 3,956,671 A | 5/1976 | Nimmersjo | |
| 3,963,964 A | 6/1976 | Mustaphi | |
| 4,001,742 A | 1/1977 | Jencks et al. | |
| 4,202,506 A * | 5/1980 | Rohner ................... 242/470 |
| 4,245,318 A | 1/1981 | Eckart et al. | |
| 4,291,299 A | 9/1981 | Hinz et al. | |
| 4,301,433 A | 11/1981 | Castonguay et al. | |
| 4,311,919 A | 1/1982 | Nail | |
| 4,399,421 A * | 8/1983 | MacLean .................. 335/174 |
| 4,415,968 A | 11/1983 | Maeda et al. | |
| 4,423,459 A | 12/1983 | Stich et al. | |
| 4,432,031 A | 2/1984 | Premerlani | |
| 4,455,612 A | 6/1984 | Girgis et al. | |
| 4,468,714 A | 8/1984 | Russell | |
| 4,535,409 A * | 8/1985 | Jindrick et al. .......... 700/293 |
| 4,589,074 A | 5/1986 | Thomas et al. | |
| 4,623,949 A | 11/1986 | Salowe et al. | |
| 4,631,625 A | 12/1986 | Alexander et al. | |
| 4,642,724 A | 2/1987 | Ruta | |

(Continued)

FOREIGN PATENT DOCUMENTS

EP    0718948 A2    6/1996

(Continued)

OTHER PUBLICATIONS

Atanackovic D. et al. An Integrated Knowledge-Based Model For Power-System Planning IEEE Expert, IEEE Inc. New York, Jul. 1997; pp. 65-71.

*Primary Examiner*—Stephen W. Jackson
*Assistant Examiner*—James A. Demakis
(74) *Attorney, Agent, or Firm*—Ohlandt, Greeley, Ruggiero & Perle, L.L.P.

(57) ABSTRACT

A circuit breaker lockout device is provided that prevents the breaker contacts from being closed when the circuit breaker is in a lockout state in response to a lockout signal and permits the breaker contacts to be closed when the circuit breaker is an enable state in response to an enable signal.

35 Claims, 5 Drawing Sheets

U.S. PATENT DOCUMENTS

| | | | |
|---|---|---|---|
| 4,644,438 A * | 2/1987 | Puccinelli et al. ............ 361/75 |
| 4,652,966 A | 3/1987 | Farag et al. |
| 4,672,501 A | 6/1987 | Bilac et al. |
| 4,672,555 A | 6/1987 | Hart et al. |
| 4,674,062 A | 6/1987 | Premerlani |
| 4,689,712 A | 8/1987 | Demeyer |
| 4,709,339 A | 11/1987 | Fernandes |
| 4,751,653 A | 6/1988 | Junk et al. |
| 4,752,853 A | 6/1988 | Matsko et al. |
| 4,754,407 A | 6/1988 | Nolan |
| 4,777,607 A | 10/1988 | Maury et al. |
| 4,783,748 A | 11/1988 | Swarztrauber et al. |
| 4,796,027 A | 1/1989 | Smith-Vaniz |
| 4,833,592 A | 5/1989 | Yamanaka |
| 4,849,848 A | 7/1989 | Ishii |
| 4,855,671 A | 8/1989 | Fernandes |
| 4,862,308 A | 8/1989 | Udren |
| 4,964,058 A | 10/1990 | Brown, Jr. |
| 4,979,122 A | 12/1990 | Davis et al. |
| 4,983,955 A | 1/1991 | Ham, Jr. et al. |
| 4,994,934 A * | 2/1991 | Bouhenguel ................ 361/71 |
| 4,996,646 A | 2/1991 | Farrington |
| 5,053,735 A | 10/1991 | Ohishi et al. |
| 5,060,166 A | 10/1991 | Engel et al. |
| 5,101,191 A | 3/1992 | MacFadyen et al. |
| 5,134,691 A | 7/1992 | Elms |
| 5,136,458 A | 8/1992 | Durivage, III |
| 5,162,664 A | 11/1992 | Haun et al. |
| 5,166,887 A | 11/1992 | Farrington et al. |
| 5,170,310 A | 12/1992 | Studtmann et al. |
| 5,170,360 A | 12/1992 | Porter et al. |
| 5,179,376 A | 1/1993 | Pomatto |
| 5,182,547 A | 1/1993 | Griffith |
| 5,185,705 A | 2/1993 | Farrington |
| 5,196,831 A | 3/1993 | Bscheider |
| 5,214,560 A | 5/1993 | Jensen |
| 5,216,621 A | 6/1993 | Dickens |
| 5,225,994 A | 7/1993 | Arinobu et al. |
| 5,231,565 A | 7/1993 | Bilas et al. |
| 5,237,511 A | 8/1993 | Caird et al. |
| 5,247,454 A | 9/1993 | Farrington et al. |
| 5,253,159 A | 10/1993 | Bilas et al. |
| 5,272,438 A | 12/1993 | Stumme |
| 5,301,121 A | 4/1994 | Garverick et al. |
| 5,303,112 A * | 4/1994 | Zulaski et al. ................ 361/67 |
| 5,305,174 A | 4/1994 | Morita et al. |
| 5,311,392 A | 5/1994 | Kinney et al. |
| 5,323,307 A | 6/1994 | Wolf et al. |
| 5,353,188 A | 10/1994 | Hatakeyama |
| 5,357,394 A * | 10/1994 | Piney ......................... 361/72 |
| 5,361,184 A | 11/1994 | El-Sharkawi et al. |
| 5,367,427 A | 11/1994 | Matsko et al. |
| 5,369,356 A | 11/1994 | Kinney et al. |
| 5,381,554 A | 1/1995 | Langer et al. |
| 5,384,712 A | 1/1995 | Oravetz et al. |
| 5,402,299 A | 3/1995 | Bellei |
| 5,406,495 A | 4/1995 | Hill |
| 5,414,635 A | 5/1995 | Ohta |
| 5,420,799 A | 5/1995 | Peterson et al. |
| 5,422,778 A | 6/1995 | Good et al. |
| 5,440,441 A | 8/1995 | Ahuja |
| 5,451,879 A | 9/1995 | Moore |
| 5,487,016 A | 1/1996 | Elms |
| 5,490,086 A | 2/1996 | Leone et al. |
| 5,493,468 A | 2/1996 | Hunter et al. |
| 5,530,738 A | 6/1996 | McEachern |
| 5,534,782 A | 7/1996 | Nourse |
| 5,534,833 A | 7/1996 | Castonguay et al. |
| 5,537,327 A | 7/1996 | Snow et al. |
| 5,544,065 A | 8/1996 | Engel et al. |
| 5,559,719 A | 9/1996 | Johnson et al. |
| 5,560,022 A | 9/1996 | Dunstan et al. |
| 5,576,625 A | 11/1996 | Sukegawa et al. |
| 5,581,471 A | 12/1996 | McEachern et al. |
| 5,587,917 A | 12/1996 | Elms |
| 5,596,473 A | 1/1997 | Johnson et al. |
| 5,600,527 A | 2/1997 | Engel et al. |
| 5,608,646 A | 3/1997 | Pomatto |
| 5,613,798 A | 3/1997 | Braverman |
| 5,619,392 A | 4/1997 | Bertsch et al. |
| 5,627,716 A | 5/1997 | Lagree et al. |
| 5,627,717 A | 5/1997 | Pein et al. |
| 5,627,718 A | 5/1997 | Engel et al. |
| 5,629,825 A | 5/1997 | Wallis et al. |
| 5,631,798 A | 5/1997 | Seymour et al. |
| 5,638,296 A | 6/1997 | Johnson et al. |
| 5,650,936 A | 7/1997 | Loucks et al. |
| 5,661,658 A | 8/1997 | Putt et al. |
| 5,666,256 A | 9/1997 | Zavis et al. |
| 5,670,923 A | 9/1997 | Gonzalez et al. |
| 5,694,329 A | 12/1997 | Pomatto |
| 5,696,695 A | 12/1997 | Ehlers et al. |
| 5,719,738 A | 2/1998 | Singer et al. |
| 5,734,576 A | 3/1998 | Klancher |
| 5,736,847 A | 4/1998 | Van Doorn et al. |
| 5,737,231 A | 4/1998 | Pyle et al. |
| 5,742,513 A | 4/1998 | Bouhenguel et al. |
| 5,751,524 A | 5/1998 | Swindler |
| 5,754,033 A | 5/1998 | Thomson |
| 5,754,440 A | 5/1998 | Cox et al. |
| 5,768,148 A | 6/1998 | Murphy et al. |
| 5,784,237 A | 7/1998 | Velez |
| 5,784,243 A | 7/1998 | Pollman et al. |
| 5,786,699 A | 7/1998 | Sukegawa et al. |
| 5,812,389 A | 9/1998 | Katayama et al. |
| 5,821,704 A | 10/1998 | Carson et al. |
| 5,825,643 A | 10/1998 | Dvorak et al. |
| 5,828,576 A | 10/1998 | Loucks et al. |
| 5,828,983 A | 10/1998 | Lombardi |
| 5,831,428 A | 11/1998 | Pyle et al. |
| 5,867,385 A | 2/1999 | Brown et al. |
| 5,872,722 A | 2/1999 | Oravetz et al. |
| 5,872,785 A | 2/1999 | Kienberger |
| 5,890,097 A | 3/1999 | Cox |
| 5,892,449 A | 4/1999 | Reid et al. |
| 5,903,426 A | 5/1999 | Ehling |
| 5,905,616 A | 5/1999 | Lyke |
| 5,906,271 A | 5/1999 | Castonguay et al. |
| 5,926,089 A | 7/1999 | Sekiguchi et al. |
| 5,936,817 A | 8/1999 | Matsko et al. |
| 5,946,210 A | 8/1999 | Montminy et al. |
| 5,958,060 A | 9/1999 | Premerlani |
| 5,963,457 A | 10/1999 | Kanoi et al. |
| 5,973,481 A | 10/1999 | Thompson et al. |
| 5,973,899 A | 10/1999 | Williams et al. |
| 5,982,595 A | 11/1999 | Pozzuoli |
| 5,982,596 A | 11/1999 | Spencer et al. |
| 5,995,911 A | 11/1999 | Hart |
| 6,005,757 A | 12/1999 | Shvach et al. |
| 6,005,758 A | 12/1999 | Spencer et al. |
| 6,018,451 A | 1/2000 | Lyke et al. |
| 6,038,516 A | 3/2000 | Alexander et al. |
| 6,047,321 A | 4/2000 | Raab et al. |
| 6,054,661 A | 4/2000 | Castonguay et al. |
| 6,055,145 A | 4/2000 | Lagree et al. |
| 6,061,609 A | 5/2000 | Kanoi et al. |
| 6,084,758 A | 7/2000 | Clarey et al. |
| 6,138,241 A | 10/2000 | Eckel et al. |
| 6,139,327 A | 10/2000 | Callahan et al. |
| 6,141,196 A | 10/2000 | Premerlani et al. |
| 6,157,527 A | 12/2000 | Spencer et al. |
| 6,167,329 A | 12/2000 | Engel et al. |
| 6,175,780 B1 | 1/2001 | Engel |
| 6,185,482 B1 | 2/2001 | Egolf et al. |

| | | | | | | |
|---|---|---|---|---|---|---|
| 6,185,508 | B1 | 2/2001 | Van Doorn et al. | 6,816,757 B1 * | 11/2004 | De La Ree et al. ........ 700/286 |
| 6,186,842 | B1 | 2/2001 | Hirschbold et al. | 2001/0010032 A1 | 7/2001 | Ehlers et al. |
| 6,195,243 | B1 | 2/2001 | Spencer et al. | 2001/0032025 A1 | 10/2001 | Lenz et al. |
| 6,198,402 | B1 | 3/2001 | Hasegawa et al. | 2001/0044588 A1 | 11/2001 | Mault |
| 6,212,049 | B1 | 4/2001 | Spencer et al. | 2001/0048354 A1 | 12/2001 | Douville et al. |
| 6,233,128 | B1 | 5/2001 | Spencer et al. | 2001/0055965 A1 | 12/2001 | Delp et al. |
| 6,236,949 | B1 | 5/2001 | Hart | 2002/0010518 A1 | 1/2002 | Reid et al. |
| 6,242,703 | B1 | 6/2001 | Castonguay et al. | 2002/0032535 A1 | 3/2002 | Alexander et al. |
| 6,268,991 | B1 | 7/2001 | Criniti et al. | 2002/0034086 A1 | 3/2002 | Scoggins et al. |
| 6,285,917 | B1 | 9/2001 | Sekiguchi et al. | 2002/0045992 A1 | 4/2002 | Shincovich et al. |
| 6,288,882 | B1 | 9/2001 | DiSalvo et al. | 2002/0059401 A1 | 5/2002 | Austin |
| 6,289,267 | B1 | 9/2001 | Alexander et al. | 2002/0063635 A1 | 5/2002 | Shincovich |
| 6,291,911 | B1 | 9/2001 | Dunk et al. | 2002/0064010 A1 | 5/2002 | Nelson et al. |
| 6,292,340 | B1 | 9/2001 | O'Regan et al. | 2002/0091949 A1 | 7/2002 | Ykema |
| 6,292,717 | B1 | 9/2001 | Alexander et al. | 2002/0094799 A1 | 7/2002 | Elliott et al. |
| 6,292,901 | B1 | 9/2001 | Lys et al. | 2002/0107615 A1 | 8/2002 | Bjorklund |
| 6,297,939 B1 * | | 10/2001 | Bilac et al. ................ 361/64 | 2002/0108065 A1 | 8/2002 | Mares |
| 6,313,975 | B1 | 11/2001 | Dunne et al. | 2002/0109722 A1 | 8/2002 | Rogers et al. |
| 6,341,054 | B1 | 1/2002 | Walder et al. | 2002/0111980 A1 | 8/2002 | Miller et al. |
| 6,347,027 | B1 | 2/2002 | Nelson et al. | 2002/0116092 A1 | 8/2002 | Hamamatsu et al. |
| 6,351,823 | B1 | 2/2002 | Mayer et al. | 2002/0124011 A1 | 9/2002 | Baxter et al. |
| 6,356,422 | B1 | 3/2002 | Bilac et al. | 2002/0146076 A1 | 10/2002 | Lee |
| 6,356,849 | B1 | 3/2002 | Jaffe | 2002/0146083 A1 | 10/2002 | Lee et al. |
| 6,369,996 | B1 | 4/2002 | Bo | 2002/0147503 A1 | 10/2002 | Osburn, III |
| 6,377,051 | B1 | 4/2002 | Tyner et al. | 2002/0159402 A1 | 10/2002 | Binder |
| 6,385,022 | B1 | 5/2002 | Kulidjian et al. | 2002/0162014 A1 | 10/2002 | Przydatek et al. |
| 6,396,279 | B1 | 5/2002 | Gruenert | 2002/0163918 A1 | 11/2002 | Cline |
| 6,397,155 | B1 | 5/2002 | Przydatek et al. | 2002/0165677 A1 | 11/2002 | Lightbody et al. |
| 6,405,104 | B1 | 6/2002 | Dougherty | 2002/0181174 A1 | 12/2002 | Bilac et al. |
| 6,406,328 | B1 | 6/2002 | Attarian et al. | 2002/0193888 A1 | 12/2002 | Wewalaarachchi et al. |
| 6,411,865 | B1 | 6/2002 | Qin et al. | 2003/0043785 A1 | 3/2003 | Liu et al. |
| 6,441,931 | B1 | 8/2002 | Moskovich et al. | | | |
| 6,459,997 | B1 | 10/2002 | Anderson | | | |
| 6,496,342 | B1 | 12/2002 | Horvath et al. | | | |
| 6,504,694 B1 * | | 1/2003 | Bilac et al. ................ 361/93.2 | EP | 0723325 A1 | 7/1996 |
| 6,535,797 | B1 | 3/2003 | Bowles et al. | EP | 0949734 A2 | 10/1999 |
| 6,549,880 | B1 | 4/2003 | Willoughby et al. | | | |
| 6,553,418 | B1 | 4/2003 | Collins et al. | * cited by examiner | | |

FOREIGN PATENT DOCUMENTS

CIRCUIT BREAKER LOCKOUT

CROSS-REFERENCE TO RELATED APPLICATIONS

This application is related to U.S. Patent Application No. 60/359,544 filed on Feb. 25, 2002 for "Integrated Protection, Monitoring, and Control" the contents of which are incorporated by reference herein. This application is also related to U.S. Patent Application No. 60/438,159 filed on Jan. 6, 2003 for "Single Processor Concept for Protection and Control of Circuit Breakers in Low-Voltage Switchgear" the contents of which are incorporated by reference herein.

BACKGROUND OF THE INVENTION

1. Field of the Invention

This invention relates generally to power distribution systems and, more particularly, to a method and apparatus for control of circuit protection devices.

2. Description of the Prior Art

In power distribution systems, power is distributed to various loads and is typically divided into branch circuits, which supply power to specified loads. The branch circuits also can be connected to various other power distribution equipment, transformers, which step down the supply voltage for use by a specific piece of electrical equipment.

Due to the concern of an abnormal power condition in the system, i.e., a fault, it is known to provide circuit protective devices to protect the various loads, as well as the power distribution equipment. The circuit protective devices, e.g., circuit breakers, seek to prevent or minimize damage. The circuit breakers also seek to minimize the extent and duration of electrical service interruption in the event of a fault.

It is further known to utilize lockout mechanisms for circuit breakers that interact with the circuit breaker operating mechanisms to prevent the breaker contacts from being closed until the lockout mechanism is manually reset. Such lockout mechanisms also include solenoids having biased plungers that immediately return to their home position when the solenoid is de-energized.

Such lockout mechanisms suffer from the drawback of requiring manual intervention to reset the mechanism and enable the closing of the circuit breaker. These lockout mechanisms also suffer from the drawback of requiring continuous energizing of the solenoid to maintain the circuit breaker in the desired lockout state. In circuits having protection systems incorporating such mechanisms, loss of power and/or loss of communication within the protection system can result in unwanted changes to the lockout state of the breakers of the protection system. Such changes can occur regardless of the duration of the loss of power and/or loss of communication, and regardless of the extent of the loss of power and/or loss of communication throughout the system.

Accordingly, there is a need for circuit protection devices that reduce the risk of damage to a circuit in the event of a loss of power and/or a loss of communication within the protection system incorporating the circuit protection devices. There is a further need for protection systems having lockout devices that do not require continuous signals or energy to maintain a desired state or configuration of protection, and which are stable in a given lockout state.

SUMMARY OF THE INVENTION

In one aspect, a method of controlling a circuit breaker having at least one contact is provided. The method comprises generating a lockout signal or an enable signal; preventing the contact from closing when the circuit breaker receives the lockout signal, thereby causing a lockout state; and permitting the contact to close when the circuit breaker receives the enable signal, thereby causing an enable state.

In another aspect, a method of controlling a circuit breaker with at least one contact disposed within a circuit is provided. The method comprises detecting a fault in the circuit; opening the contact in response to the fault; generating either a lockout signal or an enable signal; preventing the contact from closing when the circuit breaker receives the lockout signal, thereby causing a lockout state; and permitting the contact to close when the circuit breaker receives the enable signal, thereby causing an enable state.

In yet another aspect, a method of protecting a circuit having a circuit breaker having at least one contact is provided. The method comprises generating a lockout signal or an enable signal at a control processing unit; communicating the lockout signal or the enable signal over a network to the circuit breaker; preventing the contact from closing when the circuit breaker receives the lockout signal, thereby causing a lockout state; and permitting the contact to close when the circuit breaker receives the enable signal, thereby causing an enable state.

In a further aspect, a lockout device, responsive to a lockout signal and an enable signal, for a circuit breaker having at least one contact is provided. The device comprises a locking member operably connected to the circuit breaker with the locking member being moveable between a first position preventing the contact from being closed thereby causing a lockout state and a second position permitting the contact to close thereby causing an enable state. The device further comprises a locking mechanism operably connected to the locking member for moving the locking member between the first and second positions. The locking mechanism moves the locking member into the first position in response to the lockout signal and the locking mechanism moves the locking member into the second position in response to the enable signal.

In yet a further aspect, a circuit breaker responsive to a lockout signal and an enable signal is provided comprising at least one contact; an operating mechanism operably connected to the contact for opening and closing the contact; and a locking member operably connected to the operating mechanism. The locking member is moveable between a first position preventing the operating mechanism from closing the contact and a second position permitting the operating mechanism to close the contact. The circuit breaker further comprises a locking mechanism operably connected to the locking member for moving the locking member between the first and second positions. The locking mechanism moves the locking member into the first position in response to the lockout signal and the locking mechanism moves the locking member into the second position in response to the enable signal.

In still a further aspect, a protection system for a circuit is provided. The protection system comprises a circuit breaker having at least one contact with the circuit breaker being coupled to the circuit; a lockout device operably connected to the circuit breaker to prevent the contact from closing thereby causing a lockout state and to permit the contact to be closed thereby causing an enable state; at least one control processing unit controlling the lockout device;

and a network communicatively coupled to the at least one control processing unit and the lockout device. The at least one control processing unit selectively generates a lockout signal and communicates the lockout signal over the network to the lockout device. The circuit breaker is placed into the lockout state by the lockout device in response to the lockout signal. The at least one control processing unit selectively generates an enable signal and communicates the enable signal over the network to the lockout device. The circuit breaker is placed into the enable state by the lockout device in response to the enable signal.

In yet another further aspect, a power distribution system is provided comprising a circuit having a circuit breaker, a power source and a load, with the circuit breaker having at least one contact. The system further comprises a lockout device operably connected to the circuit breaker to prevent the circuit breaker from closing the contact thereby causing a lockout state and to permit the circuit breaker to close the contact thereby causing an enable state. The system further comprises at least one control processing unit controlling the lockout device and controlling opening and closing of the contact. The system further comprises a network communicatively coupled to the at least one control processing unit, the lockout device and the circuit breaker. The at least one control processing unit selectively generates a lockout signal and communicates the lockout signal over the network to the lockout device. The circuit breaker is placed into the lockout state by the lockout device in response to the lockout signal. The at least one control processing unit selectively generates an enable signal and communicates the enable signal over the network to the lockout device. The circuit breaker is placed into the enable state by the lockout device in response to the enable signal.

The above-described and other features and advantages of the present disclosure will be appreciated and understood by those skilled in the art from the following detailed description, drawings, and appended claims.

DETAILED DESCRIPTION OF THE INVENTION

Figure 1:
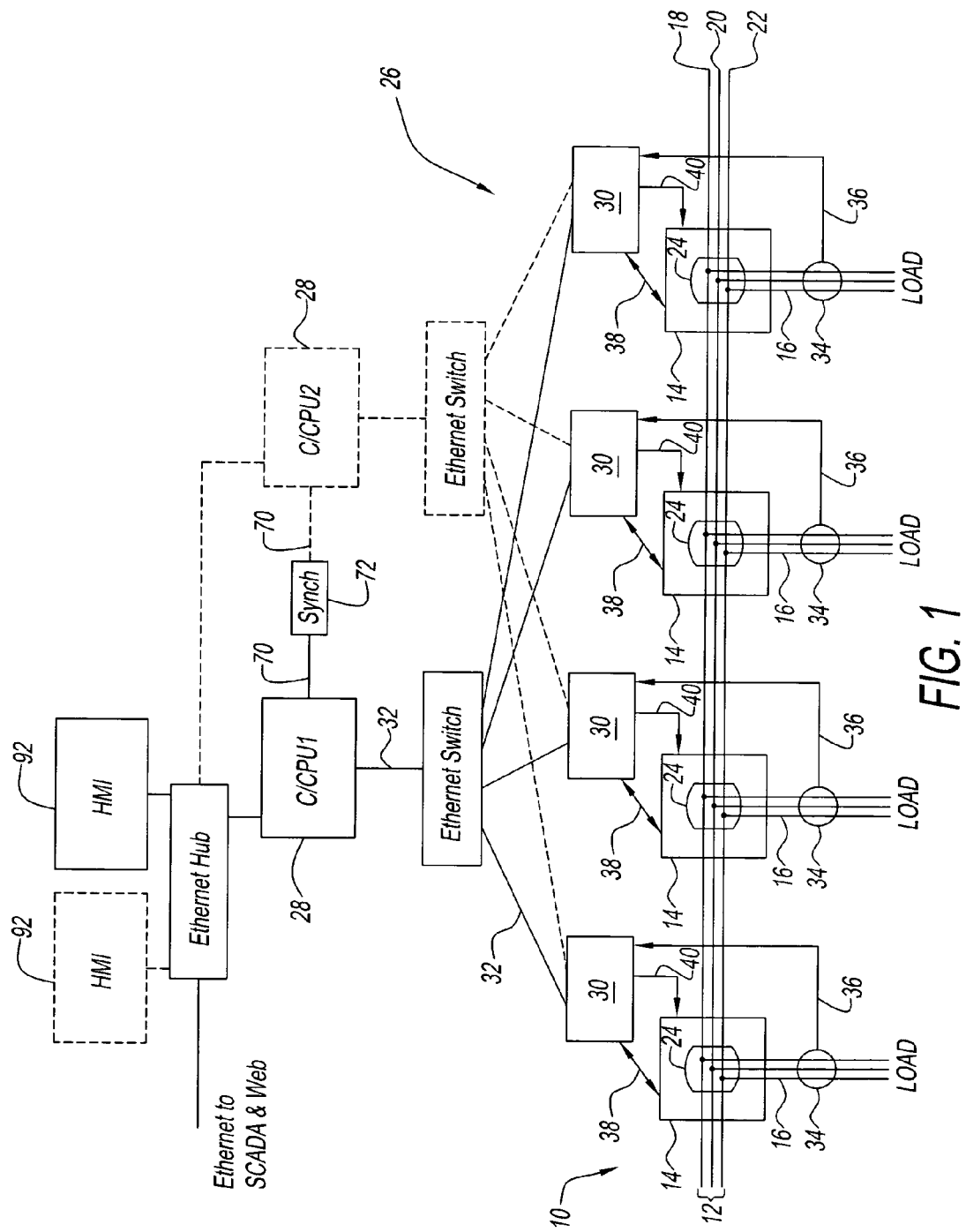
FIG. 1 is a schematic illustration of a power distribution system.

Referring now to the drawings and in particular to FIG. 1, an exemplary embodiment of a power distribution system generally referred to by reference numeral 10 is illustrated. System 10 distributes power from at least one power bus 12 through a number or plurality of circuit breakers 14 to branch circuits 16.

Power bus 12 is illustrated by way of example as a three-phase power system having a first phase 18, a second phase 20, and a third phase 22. Power bus 12 can also include a neutral phase (not shown). System 10 is illustrated for purposes of clarity distributing power from power bus 12 to four circuits 16 by four breakers 14. Of course, it is contemplated by the present disclosure for power bus 12 to have any desired number of phases and/or for system 10 to have any desired number of circuit breakers 14.

Each circuit breaker 14 has a set of separable contacts 24 (illustrated schematically). Contacts 24 selectively place power bus 12 in communication with at least one load (also illustrated schematically) on circuit 16. The load can include devices, such as, but not limited to, motors, welding machinery, computers, heaters, lighting, and/or other electrical equipment.

Power distribution system 10 is illustrated in FIG. 1 with an exemplary embodiment of a centrally controlled and fully integrated protection, monitoring, and control system 26 (hereinafter "system"). System 26 is configured to control and monitor power distribution system 10 from a central control processing unit 28 (hereinafter "CCPU"). CCPU 28 communicates with a number or plurality of data sample and transmission modules 30 (hereinafter "module") over a data network 32. Network 32 communicates all of the information from all of the modules 30 substantially simultaneously to CCPU 28.

Thus, system 26 can include protection and control schemes that consider the value of electrical signals, such as current magnitude and phase, at one or all circuit breakers 14. Further, system 26 integrates the protection, control, and monitoring functions of the individual breakers 14 of power distribution system 10 in a single, centralized control processor (e.g., CCPU 28). System 26 provides CCPU 28 with all of a synchronized set of information available through digital communication with modules 30 and circuit breakers 14 on network 32 and provides the CCPU with the ability to operate these devices based on this complete set of data.

Specifically, CCPU 28 performs all primary power distribution functions for power distribution system 10. Namely, CCPU 28 performs all instantaneous overcurrent protection (IOC), short time overcurrent, longtime overcurrent, relay protection, and logic control as well as digital signal processing functions of system 26. Thus, system 26 enables settings to be changed and data to be logged in single, central location, i.e., CCPU 28. CCPU 28 is described herein by way of example as a central processing unit. Of course, it is contemplated by the present disclosure for CCPU 28 to include any programmable circuit, such as, but not limited to, computers, processors, microcontrollers, microcomputers, programmable logic controllers, application specific integrated circuits, and other programmable circuits.

As shown in FIG. 1, each module 30 is in communication with one of the circuit breakers 14. Each module 30 is also in communication with at least one sensor 34 sensing a condition or electrical parameter of the power in each phase (e.g., first phase 18, second phase 20, third phase 22, and neutral) of bus 12 and/or circuit 16. Sensors 34 can include current transformers (CTs), potential transformers (PTs), and any combination thereof. Sensors 34 monitor a condition or electrical parameter of the incoming power in circuits 16 and provide a first or parameter signal 36 representative of the condition of the power to module 30. For example, sensors 34 can be current transformers that generate a secondary current proportional to the current in circuit 16 so that first signals 36 are the secondary current.

Module 30 sends and receives one or more second signals 38 to and/or from circuit breaker 14. Second signals 38 can be representative of one or more conditions of breaker 14, such as, but not limited to, a position or state of separable contacts 24, a spring charge switch status, a lockout state or condition, and others. In addition, module 30 is configured to operate or actuate circuit breaker 14 by sending one or more third signals 40 to the breaker to open/close separable contacts 24 as desired, such as open/close commands or signals. In a first embodiment, circuit breakers 14 cannot open separable contacts 24 unless instructed to do so by system 26.

System 26 utilizes data network 32 for data acquisition from modules 30 and data communication to the modules. Accordingly, network 32 is configured to provide a desired level of communication capacity and traffic management between CCPU 28 and modules 30. In an exemplary embodiment, network 32 can be configured to not enable communication between modules 30 (i.e., no module-to-module communication).

In addition, system 26 can be configured to provide a consistent fault response time. As used herein, the fault response time of system 26 is defined as the time between when a fault condition occurs and the time module 30 issues an trip command to its associated breaker 14. In an exemplary embodiment, system 26 has a fault response time that is less than a single cycle of the 60 Hz (hertz) waveform. For example, system 26 can have a maximum fault response time of about three milliseconds.

The configuration and operational protocols of network 32 are configured to provide the aforementioned communication capacity and response time. For example, network 32 can be an Ethernet network having a star topology as illustrated in FIG. 1. In this embodiment, network 32 is a full duplex network having the collision-detection multiple-access (CSMA/CD) protocols typically employed by Ethernet networks removed and/or disabled. Rather, network 32 is a switched Ethernet for managing collision domains.

In this configuration, network 32 provides a data transfer rate of at least about 100 Mbps (megabits per second). For example, the data transfer rate can be about 1 Gbps (gigabits per second). Additionally, communication between CCPU 28 and modules 30 across network 32 can be managed to optimize the use of network 32. For example, network 32 can be optimized by adjusting one or more of a message size, a message frequency, a message content, and/or a network speed.

Accordingly, network 32 provides for a response time that includes scheduled communications, a fixed message length, full-duplex operating mode, and a switch to prevent collisions so that all messages are moved to memory in CCPU 28 before the next set of messages is scheduled to arrive. Thus, system 26 can perform the desired control, monitoring, and protection functions in a central location and manner.

It should be recognized that data network 32 is described above by way of example only as an Ethernet network having a particular configuration, topography, and data transmission protocols. Of course, the present disclosure contemplates the use of any data transmission network that ensures the desired data capacity and consistent fault response time necessary to perform the desired range of functionality. The exemplary embodiment achieves sub-cycle transmission times between CCPU 28 and modules 30 and full sample data to perform all power distribution functions for multiple modules with the accuracy and speed associated with traditional devices.

CCPU 28 can perform branch circuit protection, zone protection, and relay protection interdependently because all of the system information is in one central location, namely at the CCPU. In addition, CCPU 28 can perform one or more monitoring functions on the centrally located system information. Accordingly, system 26 provides a coherent and integrated protection, control, and monitoring methodology not considered by prior systems. For example, system 26 integrates and coordinates load management, feed management, system monitoring, and other system protection functions in a low cost and easy to install system.

Figure 2:
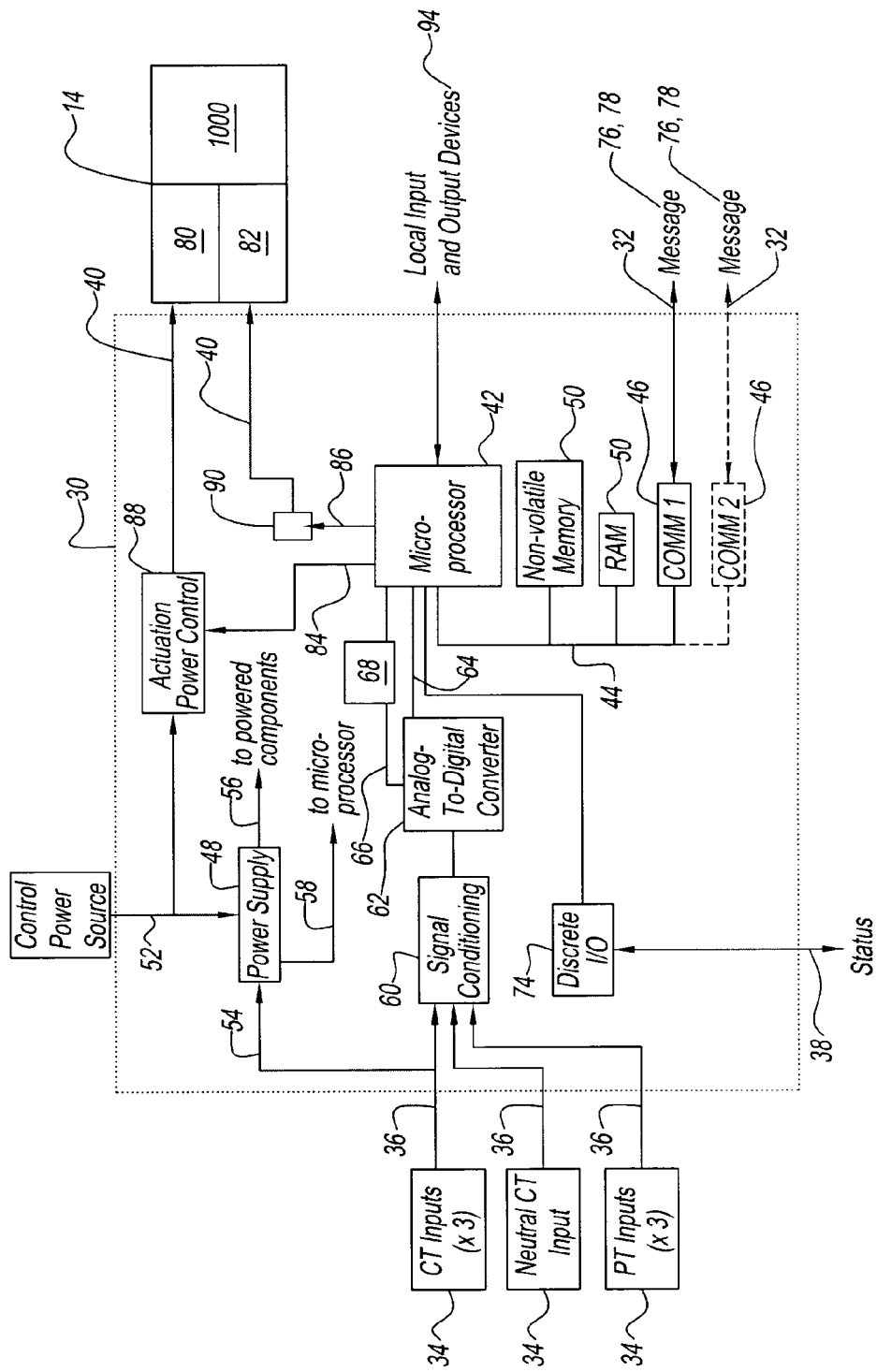
FIG. 2 is a schematic illustration of a module of the power distribution system of FIG. 1.

An exemplary embodiment of module 30 is illustrated in FIG. 2. Module 30 has a microprocessor 42, a data bus 44, a network interface 46, a power supply 48, and one or more memory devices 50.

Power supply 48 is configured to receive power from a first source 52 and/or a second source 54. First source 52 can be one or more of an uninterruptible power supply (not shown), a plurality of batteries (not shown), a power bus (not shown), and other sources. In the illustrated embodiment, second source 54 is the secondary current available from sensors 34.

Power supply 48 is configured to provide power 56 to module 30 from first and second sources 52, 54. For example, power supply 48 can provide power 56 to microprocessor 42, data bus 42, network interface 44, and memory devices 50. Power supply 48 is also configured to provide a fourth signal 58 to microprocessor 42. Fourth signal 58 is indicative of what sources are supplying power to power supply 48. For example, fourth signal 58 can indicate whether power supply 48 is receiving power from first source 52, second source 54, or both of the first and second sources.

Network interface 46 and memory devices 50 communicate with microprocessor 42 over data bus 44. Network interface 46 can be connected to network 32 so that microprocessor 42 is in communication with CCPU 28.

Microprocessor 42 receives digital representations of first signals 36 and second signals 38. First signals 36 are continuous analog data collected by sensors 34, while second signals 38 are discrete analog data from breaker 14. Thus, the data sent from modules 30 to CCPU 28 is a digital representation of the actual voltages, currents, and device status. For example, first signals 36 can be analog signals indicative of the current and/or voltage in circuit 16.

Accordingly, system 26 provides the actual raw parametric or discrete electrical data (i.e., first signals 36) and device physical status (i.e., second signal 38) to CCPU 28 via network 32, rather than processed summary information sampled, created, and stored by devices such as trip units, meters, or relays. As a result, CCPU 28 has complete, raw system-wide data with which to make decisions and can therefore operate any or all breakers 14 on network 32 based on information derived from as many modules 30 as the control and protection algorithms resident in CCPU 28 require.

Module 30 has a signal conditioner 60 and an analog-digital converter 62. First signals 36 are conditioned by signal conditioner 60 and converted to digital signals 64 by A/D converter 62. Thus, module 30 collects first signals 36 and presents digital signals 64, representative of the raw data in the first signals, to microprocessor 42. For example, signal conditioner 60 can includes a filtering circuit (not shown) to improve a signal-to-noise ratio first signal 36, a gain circuit (not shown) to amplify the first signal, a level adjustment circuit (not shown) to shift the first signal to a pre-determined range, an impedance match circuit (not shown) to facilitate transfer of the first signal to A/D converter 62, and any combination thereof. Further, A/D converter 62 can be a sample-and-hold converter with external conversion start signal 66 from microprocessor 42 or a clock circuit 68 controlled by microprocessor 42 to facilitate synchronization of digital signals 64.

It is desired for digital signals 64 from all of the modules 30 in system 26 to be collected at substantially the same time. Specifically, it is desired for digital signals 64 from all of the modules 30 in system 26 to be representative of substantially the same time instance of the power in power distribution system 10.

Modules 30 sample digital signals 64 based, at least in part, upon a synchronization signal or instruction 70 as illustrated in FIG. 1. Synchronization instruction 70 can be generated from a synchronizing clock 72 that is internal or external to CCPU 28. Synchronization instruction 70 is simultaneously communicated from CCPU 28 to modules 30 over network 32. Synchronizing clock 72 sends synchronization instructions 70 at regular intervals to CCPU 28, which forwards the instructions to all modules 30 on network 32.

Modules 30 use synchronization instruction 70 to modify a resident sampling protocol. For example, each module 30 can have a synchronization algorithm resident on microprocessor 42. The synchronization algorithm resident on microprocessor 42 can be a software phase-lock-loop algorithm. The software phase-lock-loop algorithm adjusts the sample period of module 30 based, in part, on synchronization instructions 70 from CCPU 28. Thus, CCPU 28 and modules 30 work together in system 26 to ensure that the sampling (i.e., digital signals 64) from all of the modules in the system are synchronized.

Accordingly, system 26 is configured to collect digital signals 64 from modules 30 based in part on synchronization instruction 70 so that the digital signals are representative of the same time instance, such as being within a predetermined time-window from one another. Thus, CCPU 28 can have a set of accurate data representative of the state of each monitored location (e.g., modules 30) within the power distribution system 10. The predetermined time-window can be less than about ten microseconds. For example, the predetermined time-window can be about five microseconds.

The predetermined time-window of system 26 can be affected by the port-to port variability of network 32. In an exemplary embodiment, network 32 has a port-to-port variability of in a range of about 24 nanoseconds to about 720 nanoseconds. In an alternate exemplary embodiment, network 32 has a maximum port-to-port variability of about 2 microseconds.

It has been determined that control of all of modules 30 to this predetermined time-window by system 26 enables a desired level of accuracy in the metering and vector functions across the modules, system waveform capture with coordinated data, accurate event logs, and other features. In an exemplary embodiment, the desired level of accuracy is equal to the accuracy and speed of traditional devices. For example, the predetermined time-window of about ten microseconds provides an accuracy of about 99% in metering and vector functions.

Second signals 38 from each circuit breaker 14 to each module 30 are indicative of one or more conditions of the circuit breaker. Second signals 38 are provided to a discrete I/O circuit 74 of module 30. Circuit 74 is in communication with circuit breaker 14 and microprocessor 42. Circuit 74 is configured to ensure that second signals 38 from circuit breaker 14 are provided to microprocessor 42 at a desired voltage and without jitter. For example, circuit 74 can include de-bounce circuitry and a plurality of comparators.

Microprocessor 42 samples first and second signals 36, 38 as synchronized by CCPU 28. Then, converter 62 converts the first and second signals 36, 38 to digital signals 64, which is packaged into a first message 76 having a desired configuration by microprocessor 42. First message 76 can include an indicator that indicates which synchronization signal 70 the first message was in response to. Thus, the indicator of which synchronization signal 70 first message 76 is responding to is returned to CCPU 28 for sample time identification.

CCPU 28 receives first message 76 from each of the modules 30 over network 32 and executes one or more protection and/or monitoring algorithms on the data sent in all of the first messages. Based on first message 76 from one or more modules 30, CCPU 28 can control the operation of one or more circuit breakers 14. For example, when CCPU 28 detects a fault from one or more of first messages 76, the CCPU sends a second message 78 to one or more modules 30 via network 32, such as open or close commands or signals, circuit breaker actuation or de-actuation commands or signals, or lockout or enable signals or commands.

In response to second message 78, microprocessor 42 causes third signal 40 to operate, actuate or lockout (e.g., open, close, lockout or enable contacts 24) circuit breaker 14. Circuit breaker 14 can include more than one operation or actuation mechanism. For example, circuit breaker 14 can have a shunt trip 80 and a magnetically held solenoid 82. Microprocessor 42 is configured to send a first output 84 to operate shunt trip 80 and/or a second output 86 to operate solenoid 82. First output 84 instructs a power control module 88 to provide third signal 40 (i.e., power) to shunt trip 80, which can separate contacts 24. Second output 86 instructs a gating circuit 90 to provide third signal 40 to solenoid 82 (i.e., flux shifter) to separate contacts 24. It should be noted that shunt trip 80 requires first source 52 to be present, while solenoid 82 can be operated when only second source 54 is present. In this manner, microprocessor 42 can operate circuit breaker 14 in response to second message 78 regardless of the state of first and second sources 52, 54. Additionally, a lockout device 1000 is provided that is operably connected to circuit breaker 14 and which will be described later in greater detail.

In addition to operating circuit breaker 14, module 30 can communicate to one or more local input and/or output devices 94. For example, local output device 94 can be a module status indicator, such as a visual or audible indicator. In one embodiment, device 94 is a light emitting diode (LED) configured to communicate a status of module 30. In another embodiment, local input device 94 can be a status-modifying button for manually operating one or more portions of module 30. In yet another embodiment, local input device 94 is a module interface for locally communicating with module 30.

Accordingly, modules 30 are adapted to sample first signals 36 from sensors 34 as synchronized by the CCPU. Modules 30 then package the digital representations (i.e., digital signals 64) of first and second signals 36, 38, as well as other information, as required into first message 76. First message 76 from all modules 30 are sent to CCPU 28 via network 32. CCPU 28 processes first message 76 and generates and stores instructions to control the operation of each circuit breaker 14 in second message 78. CCPU 28 sends second message 78 to all of the modules 30. In an exemplary embodiment, CCPU 28 sends second message 78 to all of the modules 30 in response to synchronization instruction 70.

Accordingly, system 26 can control each circuit breaker 14 based on the information from that breaker alone, or in combination with the information from one or more of the other breakers in the system 26. Under normal operating conditions, system 26 performs all monitoring, protection, and control decisions at CCPU 28.

Since the protection and monitoring algorithms of system 26 are resident in CCPU 28, these algorithms can be enabled without requiring hardware or software changes in circuit breaker 14 or module 30. For example, system 26 can include a data entry device 92, such as a human-machine-interface (HMI), in communication with CCPU 28. In this embodiment, one or more attributes and functions of the protection and monitoring algorithms resident on CCPU 28 can easily be modified from data entry device 92. Thus, circuit breaker 14 and module 30 can be more standardized than was possible with the circuit breakers/trip units of prior systems. For example, over one hundred separate circuit breakers/trip units have been needed to provide a full range of sizes normally required for protection of a power distribution system. However, the generic nature of circuit breaker 14 and module 30 enabled by system 26 can reduce this number by over sixty percent. Thus, system 26 can resolve the inventory issues, retrofittability issues, design delay issues, installation delay issues, and cost issues of prior power distribution systems.

It should be recognized that system 26 is described above as having one CCPU 28 communication with modules 30 by way of a single network 32. However, it is contemplated by the present disclosure for system 26 to have redundant CCPUs 26 and networks 32 as illustrated in phantom in FIG. 1. For example, module 30 is illustrated in FIG. 2 having two network interfaces 46. Each interface 46 is configured to operatively connect module 30 to a separate CCPU 28 via a separate data network 32. In this manner, system 26 would remain operative even in case of a failure in one of the redundant systems.

Modules 30 can further include one or more backup systems for controlling breakers 14 independent of CCPU 28. For example, system 26 may be unable to protect circuit 16 in case of a power outage in first source 52, during the initial startup of CCPU 28, in case of a failure of network 32, and other reasons. Under these failure conditions, each module 30 includes one or more backup systems to ensure that at least some protection is provided to circuit breaker 14. The backup system can include one or more of an analog circuit driven by second source 54, a separate microprocessor driven by second source 54, and others.

Figure 3:
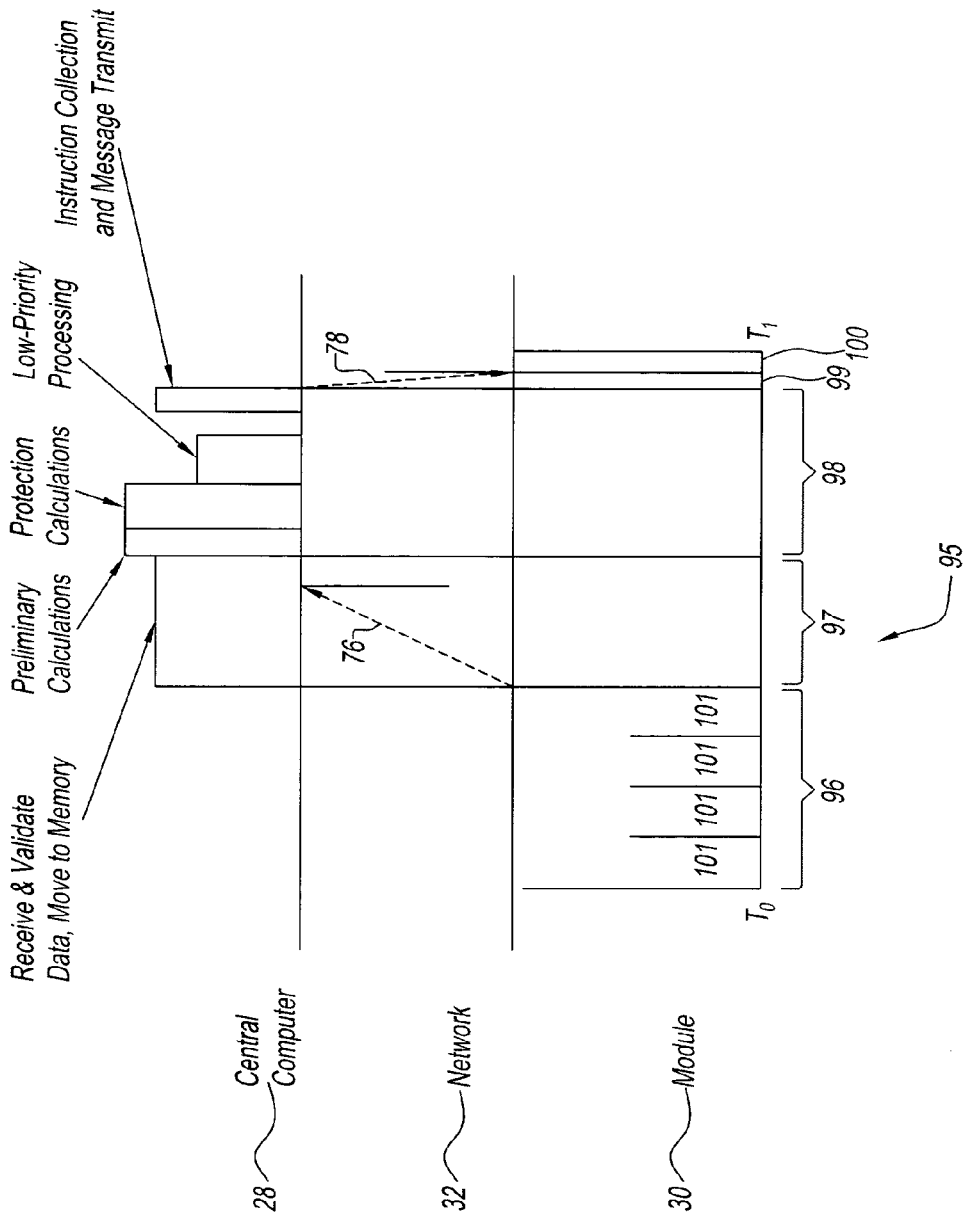
FIG. 3 is a response time for the protection system of FIG. 1.

Referring now to FIG. 3, an exemplary embodiment of a response time 95 for system 26 is illustrated with the system operating stably (e.g., not functioning in a start-up mode). Response time 95 is shown starting at T0 and ending at T1. Response time 95 is the sum of a sample time 96, a receive/validate time 97, a process time 98, a transmit time 99, and a decode/execute time 100.

In this example, system 26 includes twenty-four modules 30 each connected to a different circuit breaker 14. Each module 30 is scheduled by the phase-lock-loop algorithm and synchronization instruction 70 to sample its first signals 36 at a prescribed rate of 128 samples per cycle. Sample time 96 includes four sample intervals 101 of about 0.13 milliseconds (ms) each. Thus, sample time 96 is about 0.27 ms for data sampling and packaging into first message 76.

Receive/validate time 97 is initiated at the receipt of synchronization instruction 70. In an exemplary embodiment, receive/validate time 97 is a fixed time that is, for example, the time required to receive all first messages 76 as determined from the latency of data network 32. For example, receive/validate time 97 can be about 0.25 ms where each first message 76 has a size of about 1000 bits, system 26 includes twenty-four modules 30 (i.e., 24,000 bits), and network 32 is operating at about 100 Mbps.

Accordingly, CCPU 28 manages the communications and moving of first messages 76 to the CCPU during receive/validate time 97.

The protection processes (i.e., process time 98) starts at the end of the fixed receive/validate time 97 regardless of the receipt of first messages 76. If any modules 30 are not sending first messages 76, CCPU 28 flags this error and performs all functions that have valid data. Since system 26 is responsible for protection and control of multiple modules 30, CCPU 28 is configured to not stop the entire system due to the loss of data (i.e., first message 76) from a single module 30. In an exemplary embodiment, process time 98 is about 0.52 ms.

CCPU 28 generates second message 78 during process time 98. Second message 78 can be twenty-four second messages (i.e., one per module 30) each having a size of about 64 bits per module. Alternately, it is contemplated by the present disclosure for second message 78 to be a single, multi-cast or broadcast message. In this embodiment, second message 78 includes instructions for each module 30 and has a size of about 1600 bits.

Transmit time 99 is the time necessary to transmit second message 78 across network 32. In the example where network 32 is operating at about 100 Mbps and second message 78 is about 1600 bits, transmit time 99 is about 0.016 ms.

It is also contemplated for second message 78 to include a portion of synchronization instruction 70. For example, CCPU 28 can be configured to send second message 78 upon receipt of the next synchronization instruction 70 from clock 72. In this example, the interval between consecutive second messages 76 can be measured by module 30 and the synchronization information in the second message, if any, can be used by the synchronization algorithm resident on microprocessor 42.

Once modules 30 receive second message 78, each module decodes the message and executes its instructions (i.e., send third signals 40), if any, in decode/execute time 100. For example, decode/execute time 100 can be about 0.05 ms.

In this example, response time 95 is about 1.11 ms. Of course, it should be recognized that system response time 95 can be accelerated or decelerated based upon the needs of system 26. For example, system response time 95 can be adjusted by changing one or more of the sample period, the number of samples per transmission, the number of modules 30, the message size, the message frequency, the message content, and/or the network speed.

It is contemplated by the present disclosure for system 26 to have response time 95 of up to about 3 milliseconds. Thus, system 26 is configured to open any of its circuit breakers within about 3 milliseconds from the time sensors 34 sense conditions outside of the set parameters.

Figure 4:
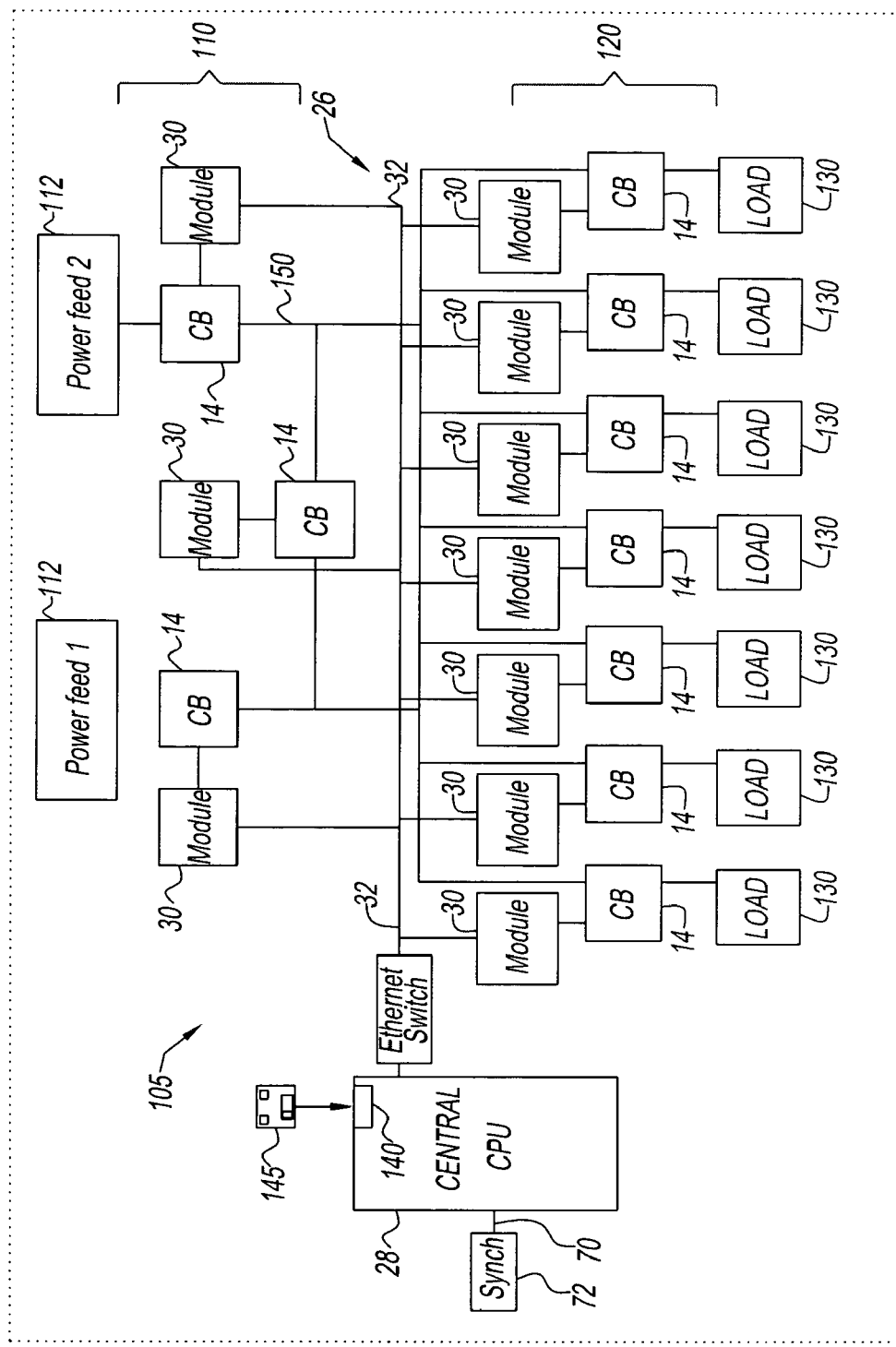
FIG. 4 is a schematic illustration of a multiple source power distribution system.

Referring to FIG. 4, an exemplary embodiment of a multi-source, multi-tier power distribution system generally referred to by reference numeral 105 is illustrated with features similar to the features of FIG. 1 being referred to by the same reference numerals. System 105 functions as described above with respect to the embodiment of FIGS. 1 through 3, and can include the same features but in a multi-source, multi-layer configuration. System 105 distributes power from at least one power feed 112, in this embodiment a first and second power feed, through a power distribution bus 150 to a number or plurality of circuit breakers 14 and to a number or plurality of loads 130. CCPU 28 can include a data transmission device 140, such as, for example, a CD-ROM drive or floppy disk drive, for reading data or instructions from a medium 145, such as, for example, a CD-ROM or floppy disk.

Circuit breakers 14 are arranged in a layered, multi-leveled or multi-tiered configuration with a first level 110 of circuit breakers and a second level 120 of circuit breakers. Of course, any number of levels or configuration of circuit breakers 14 can be used with system 105. The layered configuration of circuit breakers 14 provides for circuit breakers in first level 110 which are upstream of circuit breakers in second level 120. In the event of an abnormal condition of power in system 105, i.e., a fault, protection system 26 seeks to coordinate the system by attempting to clear the fault with the nearest circuit breaker 14 upstream of the fault. Circuit breakers 14 upstream of the nearest circuit breaker to the fault remain closed unless the downstream circuit breaker is unable to clear the fault. Protection system 26 can be implemented for any abnormal condition or parameter of power in system 105, such as, for example, long time, short time or instantaneous overcurrents, or excessive ground currents.

In order to provide the circuit breaker 14 nearest the fault with sufficient time to attempt to clear the fault before the upstream circuit breaker is opened, the upstream circuit breaker is provided with an open command at an adjusted or dynamic delay time which is determined by a zone selective interlock routine that is an algorithm, or the like, of CCPU 28. The upstream circuit breaker 14 is provided with an open command at a modified dynamic delay time that elapses before the circuit breaker is opened. In an exemplary embodiment, the modified dynamic delay time for the opening of the upstream circuit breaker 14 is based upon the location of the fault in system 105. Preferably, the modified dynamic delay time for the opening of the upstream circuit breaker 14 is based upon the location of the fault with respect to the circuit breakers and/or other devices and topology of system 105. CCPU 28 of protection system 26 can provide open commands at modified dynamic delay times for upstream circuit breakers 14 throughout power distribution system 105 depending upon where the fault has been detected in the power flow hierarchy and the modified dynamic delay times for the opening of each of these circuit breakers can preferably be over an infinite range. Protection system 26 reduces the clearing time of faults because CCPU 28 provides open commands at modified dynamic delay times for the upstream circuit breakers 14 which are optimum time periods based upon the location of the fault. It has been found that the clearing time of faults has been reduced by approximately 50% with the use of protection system 26, as compared to the use of contemporary systems.

In an exemplary embodiment, the protection functions performed at CCPU 28, are based on state information or status of circuit breakers 14, as well as current. Through the use of protection system 26, the state information is known by CCPU 28. The state information is synchronized with the current and the voltage in power distribution system 105. CCPU 28 effectively knows the topology of the power distribution system 105 and uses the state information to track topology changes in the system. CCPU 28 utilizes the topology information of power distribution system 105 to optimize service and protection.

Of course, it is contemplated by the present disclosure for power distribution system 105 to have any number of tiers or levels and any configuration of branch circuits. The dynamic delay time for opening of any number of circuit breakers 14 upstream of the fault could be modified as described above based upon the location of the fault in the power flow hierarchy. Additionally, the zones of protection and the dynamic delay times can change as the power distribution system 105 changes. In an alternate embodiment, CCPU 28 can modify the dynamic delay time for opening of the upstream circuit breakers 14 based upon other factors using different algorithms. Protection system 26 allows for the dynamic changing of the delay times for opening of circuit breakers 14 throughout the power distribution system 105 based upon any number of factors, including the location of the fault. Protection system 26 also allows for the upstream circuit breaker 14 to enter the pickup mode as a function of the downstream circuit breaker 14 fault current as opposed to its own current.

Figure 5:
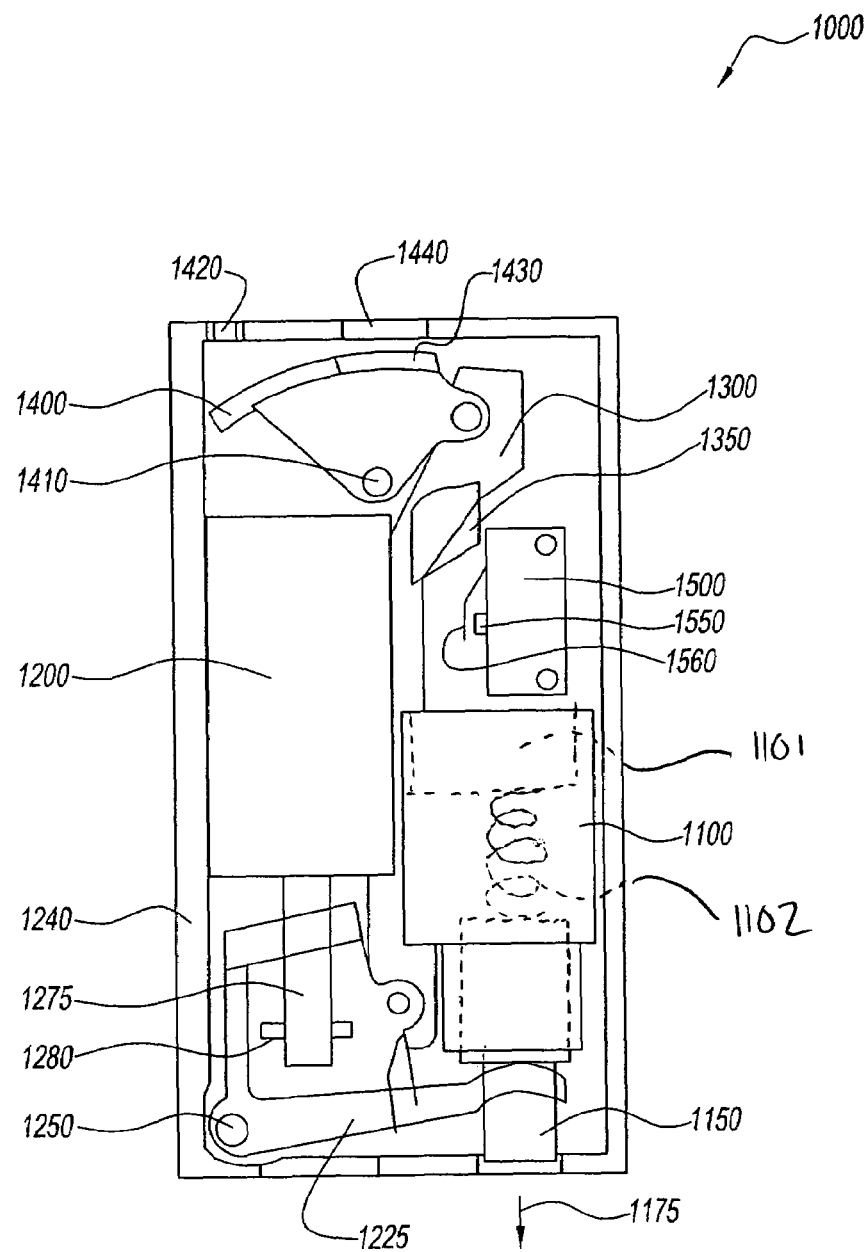
FIG. 5 is a schematic illustration of a circuit breaker lockout device.

Referring to FIG. 5, an exemplary embodiment of a circuit breaker lockout or interlock device is shown and generally represented by reference numeral 1000. Lockout device 1000 provides for remotely controlling the lockout function of circuit breakers 14 and further provides for retaining the lockout condition or state of the circuit breaker, i.e., either locked out in which contacts 24 cannot be closed or enabled in which the contacts can be closed, in the event of loss of communication or power. Thus, once a lockout position or state has been determined and established for circuit breaker 14 by lockout device 1000, the lockout device maintains the desired lockout state independent of protection system 26 maintaining that signal or command. Lockout device 1000 interacts with the operating or tripping mechanism of circuit breaker 14 in order to prevent contacts 24 from being closed when in the lockout state or permit the contacts to be closed when in the enable state. Lockout device 1000 allows locking out of circuit breaker 14 when a fault is detected and the circuit breaker is opened, as well as when it is desired to maintain a particular circuit breaker in an open state for other reasons.

When controlled over network 32, lockout device 1000 has an electronic interface and is controlled through two logic signals, i.e., a lockout signal LO to place the circuit breaker 14 in a lockout state or an enable signal ENABLE to place the circuit breaker in an enable state. In an exemplary embodiment, CCPU 28 generates the LO and ENABLE signals and communicates the signals to module 30 and to lockout device 1000, in the manner described above. The LO or ENABLE signals can be momentary or continuous signals received by lockout device 1000. The LO and ENABLE signals each have two states (0 or 1) as shown in table 1.

TABLE 1

| LO | ENABLE | Change in Breaker Lockout State |
|---|---|---|
| 0 | 0 | No effect |
| 0 | 1 | Enable |
| 1 | 0 | Lockout |
| 1 | 1 | Lockout |

Upon receipt of a lockout signal, lockout device 1000 places circuit breaker 14 in the lockout state and maintains that state. In the lockout state, contacts 24 of circuit breaker 14 cannot be closed either logically by protection system 26 or manually by an operator. Similarly, lockout device 1000 places circuit breaker 14 in the enable state upon receipt of an enable signal and maintains the circuit breaker in that state until a lockout signal is received. In the enable state, the contacts 24 can be closed logically by the protection system 26 (or manually by an operator). Lockout device 1000 establishes a higher confidence of lockout for the circuit breakers 14 for power distribution system 105.

In an exemplary embodiment, lockout device 1000 has a first or locking mechanism 1100 and a second or enabling mechanism 1200. Two separate mechanisms 1100, 1200 are used to lockout or enable circuit breaker 14. However, it is contemplated by the present disclosure for lockout device 1000 to include any number of locking and enabling mechanisms 1100, 1200, including a single mechanism, such as, but not limited to, a reversible motor or a linear positioning device. In this embodiment, locking mechanism 1100 is a first or magnetically held or solenoid ("lockout solenoid") and enabling mechanism 1200 is a second or enable solenoid. Lockout solenoid 1100 and enable solenoid 1200 are operably connected to the operating or tripping mechanism (not shown) of circuit breaker 14 so that energizing or actuating of the lockout solenoid causes the circuit breaker to be placed into the lockout state and energizing or actuating of the enable solenoid causes the circuit breaker to be placed into the enable state.

Lockout solenoid 1100 and enable solenoid 1200 are effectively configured to provide opposing movement or force, which interacts with the tripping mechanism of circuit breaker 14. Of course, it is contemplated by the present disclosure for lockout device 1000 to be operably connected with circuit breaker 14 in other ways, which places the circuit breaker in a lockout or enable state. Additionally, the present disclosure contemplates the use of other types of locking and enabling mechanisms 1100, 1200, which are operably connected with the operating or tripping mechanism or other components of circuit breaker 14, so that the circuit breaker is placed into the lockout state, as a result of the lockout signal or is placed into the enable state as a result of the enable signal, and the circuit breaker remains in the designated state until a lockout or enable signal to the contrary is received. Such other types of locking and enabling mechanisms 1100, 1200 include, but are not limited to, a pair of solenoids.

Lockout solenoid 1100 is a magnetically held solenoid having a magnet 1101, a spring 1102 and a lockout plunger or locking member 1150. Lockout plunger 1150 is a movable plunger that is moved by lockout solenoid 1100 to a first position to engage with or interact with the operating or tripping mechanism or other components of circuit breaker 14 to place the circuit breaker in the lockout state. The spring 1102 is held in a charged or compressed state by the magnet 1101 when lockout device 1000 is in the enable state. When the lockout solenoid 1100 is energized in response to a lockout signal, plunger 1150 moves partially out of the lockout solenoid to interact with the tripping mechanism of the circuit breaker 14, as represented by reference numeral 1175. The energizing of the lockout solenoid 1100 produces a magnetic field that overcomes the holding force of the magnet so that the compressed spring 1102 is released. The spring 1102 biases plunger 1150 in the first position or interactive state with the tripping mechanism of circuit breaker 14, so that the circuit breaker is maintained in the lockout state.

Lockout plunger 1150 is operably connected to enable solenoid 1200 by an enable lever 1225. Enable lever 1225 is pivotally secured to an enclosure 1240 by a pin 1250 so that the downward movement of lockout plunger 1150 into the first position causes a clockwise rotation of lever 1225. Enclosure 1240 houses lockout solenoid 1100 and enable solenoid 1200, and is secured to circuit breaker 14. Alternatively, lockout device 1000 can be contained or housed within the enclosure of circuit breaker 14. Enable solenoid 1200 has a movable enable plunger 1275 with abutments 1280. When the enable solenoid 1200 is energized in response to an enable signal, the enable plunger is moved upwardly, partially into solenoid 1200 so that abutments 1280 engage with the top portion of enable lever 1225 causing the enable lever to rotate counter-clockwise. The counter-clockwise rotation of the enable lever 1225 moves lockout plunger 1150 out of the first position or interaction with the tripping mechanism of circuit breaker 14, i.e., into the enable state, and into lockout solenoid 1100, which is the second position. This movement also causes compression or recharging of the spring, which is again held by the magnet. Thus, lockout device 1000 places circuit breaker 14 into a lockout state in response to a lockout signal as a result of the movement of lockout plunger 1150, places the circuit breaker into an enable state in response to an enable signal as a result of the movement of enable plunger 1275, and maintains the circuit breaker in either the lockout state or the enable state in the absence of a signal to the contrary, as a result of the magnet and spring. Lockout device 1000 is stable in either the lockout state or the enable state in the absence of a signal to the contrary and without continuously energizing or communicating with either the lockout solenoid 1100 or the enable solenoid 1200.

The use of a magnetically held solenoid with a spring for lockout solenoid 1100 is advantageous because it is a low power consumption device so that the circuit breaker 14 can be placed into the lockout state with the use of low power. This can be useful so that the lockout device 1000 can lockout circuit breaker 14 while using internal backup power. Additionally, the present disclosure contemplates other configurations or operable connections for first and second mechanisms 1100, 1200 or lockout device 1000 with the operating or trigger mechanism of circuit breaker 14 in order to place the circuit breaker into the lockout or enable state, and to selectively maintain the circuit breaker in the desired state.

Lockout device 1000 has a manual reset or control lever 1400 that is operably connected to enable lever 1225 by linkage 1300 so that an operator can manually place circuit breaker 14 in the enable state in emergency situations, such as when the circuit breaker needs to be reset and there is a loss of power or loss of communication to the lockout device. Reset lever 1400 is pivotally connected to enclosure 1240 by pin 1410 so that the clockwise rotation of enable lever 1225 in response to a lockout signal causes a clockwise rotation of the reset lever. This clockwise rotation of reset lever 1400 results in the reset lever being moved closer to a reset port 1420. Reset port 1420 provides an operator with access to manually rotate the reset lever in a counter-clockwise direction. The manual rotation of reset lever 1400 can be through use of a tool or other such non-incidental contact device, which results in the lockout plunger 1150 being moved out of interaction with the tripping mechanism of the circuit breaker 14 so that the breaker is manually placed into the enable state while the lockout solenoid 1100 and spring are also placed back into their respective positions in the enable state. The manual reset lever 1400 provides a mechanical defeat mechanism to lockout device 1000 while preventing incidental manual operation of the enabling function of the lockout device. The present disclosure also contemplates lever 1400 allowing manual lockout of circuit breaker 14 through use of a tool or other non-incidental contact device.

Reset lever 1400 also has a local status indicator 1430, which is visible through a status port 1440 and indicates to an operator whether circuit breaker 14 is in a lockout state or an enable state. A status switch 1500 monitors the lockout condition, i.e., either in a lockout state or in an enable state, of circuit breaker 14. The downward movement of linkage 1300 in response to a lockout signal generates a lockout condition or status signal through status switch 1500. The status switch 1500 has contacts 1550 and 1560, which are brought into contact with each other by an abutment 1350 on linkage 1300 when the linkage is moved downwardly. The status signal can then be communicated to CCPU 28.

The exemplary embodiment shows lockout device 1000 being controlled over network 32 by CCPU 28 and being a distinct device that is operably connected with each circuit breaker 14. However, the present disclosure contemplates lockout devices 1000 that are locally or individually controlled, and that are integrally formed with and part of circuit breakers 14.

While the instant disclosure has been described with reference to one or more exemplary embodiments, it will be understood by those skilled in the art that various changes may be made and equivalents may be substituted for elements thereof without departing from the scope thereof. In addition, many modifications may be made to adapt a particular situation or material to the teachings of the disclosure without departing from the scope thereof. Therefore, it is intended that the disclosure not be limited to the particular embodiment(s) disclosed as the best mode contemplated for carrying out this invention, but that the invention will include all embodiments falling within the scope of the appended claims.

What is claimed is:

1. A protection system for a circuit comprising:
   a circuit breaker having at least one contact and being operable for opening and closing of said contact, said circuit breaker being coupled to said circuit;
   a lockout device having a locking member and being operably connected to said circuit breaker to prevent said circuit breaker from closing said contact thereby causing a lockout state and to permit said circuit breaker to close said contact thereby causing an enable state, said locking member being movable;
   at least one control processing unit controlling said lockout device; and
   a network communicatively coupled to said at least one control processing unit and said lockout device,
   wherein said at least one control processing unit selectively generates a lockout signal and communicates said lockout signal over said network to said lockout device, said circuit breaker being placed into said lockout state by said locking member of said lockout device in response to said lockout signal, and
   wherein said at least one control processing unit selectively generates an enable signal and communicates said enable signal over said network to said lockout device, said circuit breaker being placed into said enable state by said locking member of said lockout device in response to said enable signal.

2. The system of claim 1, wherein said lockout device maintains said circuit breaker in said lockout state in the absence of said enable signal being communicated to said lockout device.

3. The system of claim 2, wherein said lockout device maintains said circuit breaker in said enable state in the absence of said lockout signal being communicated to said rockout device.

4. The system of claim 3, wherein said lockout device maintains said circuit breaker in said lockout state while said lockout signal is being communicated to said lockout device.

5. The system of claim 1, wherein said lockout device further comprises a locking mechanism, wherein said locking member is moveable between a first position in which said circuit breaker is placed into said lockout state by said locking member and a second position in which said circuit breaker is placed into said enable state, said locking mechanism being operably connected to said locking member for moving said locking member between said first and second positions.

6. The system of claim 5, wherein said lockout device further comprises an enclosure and a status indicator, said enclosure at least partially housing said locking member and said locking mechanism, and said status indicator being visible from outside of said enclosure, wherein said status indicator Indicates whether said circuit breaker is either in said lockout state or said enable state.

7. The system of claim 5, wherein said lockout device further comprises a manual reset lever operably connected to said locking member for manually moving said locking member into said second position.

8. The system of claim 5, wherein said lockout device further comprises a status switch operably connected to said locking member, said status switch generating a lockout status signal when said circuit breaker is in said lockout state.

9. The system of claim 5, wherein said locking mechanism comprises a first and second mechanism operably connected to said locking member, wherein said first mechanism moves said locking member into said first position in response to said lockout signal and maintains said locking member in said first position in the absence of said enable signal being communicated to said lockout device, and wherein said second mechanism moves said locking member into said second position in response to said enable signal and maintains said locking member in said second position in the absence of said lookout signal being communicated to said lockout device.

10. The system of claim 9, wherein said first mechanism is a first solenoid having a magnet and a spring, wherein said spring is in a compressed state when said circuit breaker is in said enable state, wherein said spring is held in said compressed state by said magnet and wherein energizing said first solenoid releases said spring.

11. The system of claim 10, wherein said locking member is a first plunger, wherein said first plunger moves in response to said first solenoid being energized and wherein said spring biases said first plunger into said first position when said circuit breaker is in said lockout state.

12. The system of claim 10, wherein said second mechanism is a second solenoid.

13. The system of claim 1, wherein said at least one contact is separable contacts.

14. The system of claim 1, further comprising a circuit breaker actuator operably connected to said circuit breaker for opening and closing said contact, wherein said at least one control processing unit generates a command to open and communicates said command to open to said circuit breaker actuator, said command to open causing said circuit breaker actuator to open said contact.

15. The system of claim 1, further comprising a sensor and a data sample and transmission module, wherein said sensor senses electrical parameters of said circuit, communicates signals representative of said electrical parameters to said data sample and transmission module, and wherein said module communicates said signals over said network to said at least one control processing unit.

16. The system of claim 14, further comprising generating a command to close at said control processing unit and communicating said command to close from said control processing unit to said circuit breaker actuator, said command to close causing said circuit breaker actuator to close said contact if said circuit breaker is in said enable state.

17. A power distribution system comprising:
a circuit having a circuit breaker, a power source and a load, said circuit breaker having at least one contact and being operable for opening and closing of said contact;
a lockout device having a locking member and being operably connected to said circuit breaker to prevent said circuit breaker from dosing said contact thereby causing a lockout state and to permit said circuit breaker to close said contact thereby causing an enable state, said locking member being movable;
at least one control processing unit controlling said lockout device and controlling opening and closing of said contact; and
a network communicatively coupled to said at least one control processing unit, said lockout device and said circuit breaker,
wherein said at least one control processing unit selectively generates a lockout signal and communicates said lockout signal over said network to said lockout device, said circuit breaker being placed into said lockout state by said locking member of said lockout device in response to said lockout signal, and
wherein said at least one control processing unit selectively generates an enable signal and communicates said enable signal over said network to said lockout device, said circuit breaker being placed into said enable state by said locking member of said lockout device in response to said enable signal.

18. The system of claim 17, wherein said lockout device maintains said circuit breaker in said lockout stale in the absence of said enable signal being communicated to said lockout device.

19. The system of claim 18, wherein said lockout device maintains said circuit breaker in said enable state in the absence of said lockout signal being communicated to said lockout device.

20. The system of claim 18, wherein said lockout device maintains said circuit breaker in said lockout state while said lockout signal is being communicated to said lockout device.

21. The system of claim 17, wherein said at least one control processing unit detects a fault in said circuit, generates a command to open in response to said fault and communicates said command to open to said circuit breaker, said circuit breaker opening said contact in response to said command to open.

22. The system of claim 17, wherein said at least one control processing unit generates a command to close and communicates said command to close said circuit breaker, said circuit breaker closing said contact in response to said command to close if said circuit breaker is in said enable state.

23. The system of claim 17, wherein said lockout device further comprises a locking mechanism, said locking member being moveable between a first position causing said circuit breaker to enter said lockout state and a second position causing said circuit breaker to enter said enable state, said locking mechanism being operably connected to said locking member for moving said locking member between said first and second positions.

24. The system of claim 17, wherein said circuit breaker further comprises an enclosure at least partially housing said lockout device.

25. The system of claim 17, wherein said lockout device further comprises a status indicator and an enclosure, and wherein said status indicator is visible from outside of said enclosure and indicates whether said circuit breaker is in either said lockout state or said enable state.

26. The system of claim 23, wherein said lockout device further comprises a manual reset lever operably connected to said locking member for manually moving said locking member into said second position.

27. The system of claim 23, wherein said lockout device further comprises a status switch operably connected to said locking member, and wherein said status switch generates a lockout status signal when said circuit breaker is in said lockout state and communicates said lockout status signal to said at least one control processing unit.

28. The system of claim 23, wherein said locking mechanism comprises a first and second mechanism operably connected to said locking member, wherein said first mechanism moves said locking member into said first position in response to said lockout signal and maintains said locking member in said first position in the absence of said enable signal being communicated to said lockout device, and wherein said second mechanism moves said locking member into said second position in response to said enable signal and maintains said locking member in said second position in the absence of said lockout signal being communicated to said lockout device.

29. The system of claim 28, wherein said first mechanism is a first solenoid having a magnet and a spring, wherein said spring is in a compressed state when said locking member is in said second position, wherein said spring is held in said compressed state by said magnet, and wherein energizing said first solenoid releases said spring.

30. The system of claim 29, wherein said locking member is a first plunger, wherein said first plunger moves in response to said first solenoid being energized, and wherein said spring biases said first plunger into said first position when said circuit breaker is in said lockout state.

31. The system of claim 28, wherein said second mechanism is a second solenoid.

32. The system of claim 17, wherein said at least one contact is separable contacts.

33. The system of claim 17, further comprising a data sample and transmission module communicatively coupled to said at least one control processing unit, said circuit and said network, wherein said module monitors electrical parameters of said circuit and communicates parameter signals representative of said electrical parameters to said at least one control processing unit, and wherein said at least one control processing unit selectively generates said lockout and enable signals in response to said parameter signals.

34. The system of claim 17, further comprising a data sample and transmission module communicatively coupled to said at least one control processing unit, said circuit and said network, wherein said module monitors conditions of said circuit breaker and said lockout device and communicates condition signals representative of said conditions to said at least one control processing unit, and wherein said at least one control processing unit selectively generates said lockout and enable signals in response to said condition signals.

35. The system of claim 34, wherein said conditions comprise a lockout condition and a breaker condition, wherein said lockout condition is either said lockout state or said enable state, and wherein said breaker condition is either open or closed.

* * * * *